(12) United States Patent
Andrews

(10) Patent No.: US 12,346,351 B2
(45) Date of Patent: Jul. 1, 2025

(54) REGISTRATION OF VIRTUAL OBJECT ASSOCIATION RIGHTS FOR AUGMENTED REALITY ENVIRONMENT

(71) Applicant: Randy Alan Andrews, West Linn, OR (US)

(72) Inventor: Randy Alan Andrews, West Linn, OR (US)

( * ) Notice: Subject to any disclaimer, the term of this patent is extended or adjusted under 35 U.S.C. 154(b) by 0 days.

(21) Appl. No.: 15/149,238

(22) Filed: May 9, 2016

(65) Prior Publication Data

US 2016/0335289 A1 Nov. 17, 2016

Related U.S. Application Data

(60) Provisional application No. 62/160,138, filed on May 12, 2015.

(51) Int. Cl.
*G06F 16/29* (2019.01)
*G06Q 50/16* (2024.01)
*G06T 19/00* (2011.01)

(52) U.S. Cl.
CPC ............ *G06F 16/29* (2019.01); *G06Q 50/16* (2013.01); *G06T 19/006* (2013.01)

(58) Field of Classification Search
CPC .... G06F 16/30; G06F 16/951; G06F 16/9535; G06F 17/2785; G06F 17/2881; G06F 16/00; G06F 16/113; G06F 16/134; G06F 16/156; G06F 16/20; G06F 16/2228; G06F 16/24; G06F 16/248; G06F 16/27; G06F 16/284; G06F 16/285; G06F 16/489; G06F 16/51; G06F 16/60; G06F 16/80; G06F 16/9027; G06F 16/93; G06F 16/95; G06F 16/954; G06F 16/955; G06F 16/9554; G06F 16/9558; G06F 16/957; G06F 16/972; G06F 17/00; G06F 17/246; G06F 19/00; G06F 19/18; G06F 19/22; G06F 19/28; G06F 19/321; G06F 19/324; G06F 21/31; G06F 21/33; G06F 21/6218; G06F 3/017; G06F 3/0481
USPC ........................................................ 707/736
See application file for complete search history.

(56) References Cited

U.S. PATENT DOCUMENTS

| | | | | |
|---|---|---|---|---|
| 9,261,598 | B1 * | 2/2016 | Robinson | E04H 13/008 |
| 9,626,070 | B2 * | 4/2017 | Cowles | H04L 63/0861 |
| 2009/0271369 | A1 * | 10/2009 | Cheng | G06F 16/954 |

(Continued)

FOREIGN PATENT DOCUMENTS

WO WO-2013108549 A1 * 7/2013 ......... G06F 21/6218

*Primary Examiner* — Sheree N Brown

(57) ABSTRACT

A method for registration of rights for hosting virtual objects over a property in augmented reality environment in an augmented reality registration service system. The augmented reality registration service system provides a user interface to enable a property owner to place a request for registration of rights for associating virtual objects in augmented reality environment over a property selected from maps presented through the user interface. Right of associating virtual objects over a property for display in augmented reality environment is reserved for the property owner if permissible. The system can render different virtual objects at different coordinates of the property as requested by the property owner or a third party having permission from the property owner.

24 Claims, 6 Drawing Sheets

(56) References Cited

U.S. PATENT DOCUMENTS

| | | | |
|---|---|---|---|
| 2012/0005030 A1* | 1/2012 | Valin | G06Q 30/0277 |
| | | | 709/219 |
| 2012/0081393 A1* | 4/2012 | Kim | G06F 3/011 |
| | | | 345/633 |
| 2012/0210254 A1* | 8/2012 | Fukuchi | G06F 3/012 |
| | | | 715/757 |
| 2012/0256917 A1* | 10/2012 | Lieberman | G06T 17/05 |
| | | | 345/419 |
| 2013/0297460 A1* | 11/2013 | Spivack | G06F 3/011 |
| | | | 705/27.2 |
| 2014/0114845 A1* | 4/2014 | Rogers | G06T 19/006 |
| | | | 345/419 |
| 2015/0141057 A1* | 5/2015 | Papillon | H04W 4/185 |
| | | | 455/456.3 |
| 2016/0092959 A1* | 3/2016 | Gross | G06K 9/00671 |
| | | | 705/26.62 |

* cited by examiner

REGISTRATION OF VIRTUAL OBJECT ASSOCIATION RIGHTS FOR AUGMENTED REALITY ENVIRONMENT

CROSS-REFERENCE TO RELATED APPLICATION

This application claims the benefit of U.S. Provisional Application No. 62/160,138, filed May 12, 2015 the contents of which are incorporated herein by reference.

FIELD OF THE INVENTION

The present invention relates to Augmented Reality applications. More particularly, the present invention relates to registration of virtual objects for display in augmented reality environment over a real property and personal property.

BACKGROUND OF THE INVENTION

Augmented Reality (AR) is a technology that superimposes a computer-generated image or object on a user's view of the real world, thus providing a composite view. In other words, Augmented Reality generally refers to combining computer-generated information and real-world information, which typically involves overlaying virtual imagery over real-world imagery. In today's world, AR is finding a new place in people's day-to-day life and the portable computing devices are to be thanked for that. Portable or mobile computing devices, such as smart phones, laptops, tabs etc. are all multimedia devices with built in camera and audio/video playback options. Many of such devices come equipped with GPS, compass, gyroscope, accelerometer etc. for determining their locations, directions, orientation, altitude, acceleration etc. Most of such devices today are also capable of wireless communication through Bluetooth, Near Field Communication (NFC), infra-red etc. These features are making it possible to implement AR in multiple ways.

As per law, owner's permission is needed if an advertisement hoarding/billboard is required to be raised over a building or a piece of real estate or personal property. A person enjoys the air right of the space located over his/her property. Since an AR object can be assigned to geographical coordinates over or inside a physical location, there can be situations in the future where disputes may arise as to whether permission is required from the owner of the physical property for hosting a virtual object on or over his/her property viewable in augmented reality environment. Also, a situation may arise in which a mobile virtual object enters a space registered for other AR object. Accordingly, there is a need for a system for providing solution to the aforesaid issues related to augmented reality.

OBJECTS OF THE INVENTION

It is an object of the present invention to provide a system and method for registration of rights for hosting virtual objects in augmented reality environment over a physical location.

Another object of the present invention is to provide a system and method for centralized registration of virtual objects for display in augmented reality environment.

Yet another object of the present invention is to provide a system and method for a centralized database for storing details of virtual objects.

A further object of the present invention is to provide a system and method for management of air rights over a real property and personal property for augmented reality display.

Still another object of the present invention is to provide a system and method for registering air rights around a mobile/movable personal property.

Yet another object of the present invention is to provide a system and method for registering virtual reality objects over a real property and/or personal property in different spatial coordinates as per requirement.

A further object of the present invention is to provide a system and method for management of virtual objects for display in augmented reality environment as per category of virtual objects or as per ownership of virtual objects.

These as well as other objects of the present invention are apparent upon inspection of this specification, including the drawings and appendices attached hereto.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a global/central registry, referred to as AR (Augmented Reality) registration service system which enables property owners (private, commercial, governmental, public etc.) to register rights for their legally owned properties for associating/hosting virtual objects in augmented reality applications. The AR registration service system of the present invention stores a three-dimensional spatial database for properties such as real estate, personal properties like cars, mobile devices etc. The user interface provided by a server system of the present interface allows a property owner to select his/her legally owned property and register the right (legal entitlement) for virtual object association within the spatial coordinates of that property. The AR registration service system creates and maintains a domain name system for registration of virtual object hosting/associating/floating rights as per the type of property being registered. The virtual object hosting rights can be used by the property owner itself or can be rented/leased/licensed or given to any third party user. The present invention allows association of different virtual objects to different geometrical/spatial coordinates of a single property. The AR registration system further allows users to set various levels of permissions/restrictions for virtual object display in augmented reality.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION OF THE INVENTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Throughout the present disclosure, the terms "a" and "an" are intended to denote at least one of a particular element. As used herein, the term "includes" means includes but not limited to, the term "including" means including but not limited to.

Figure 1:
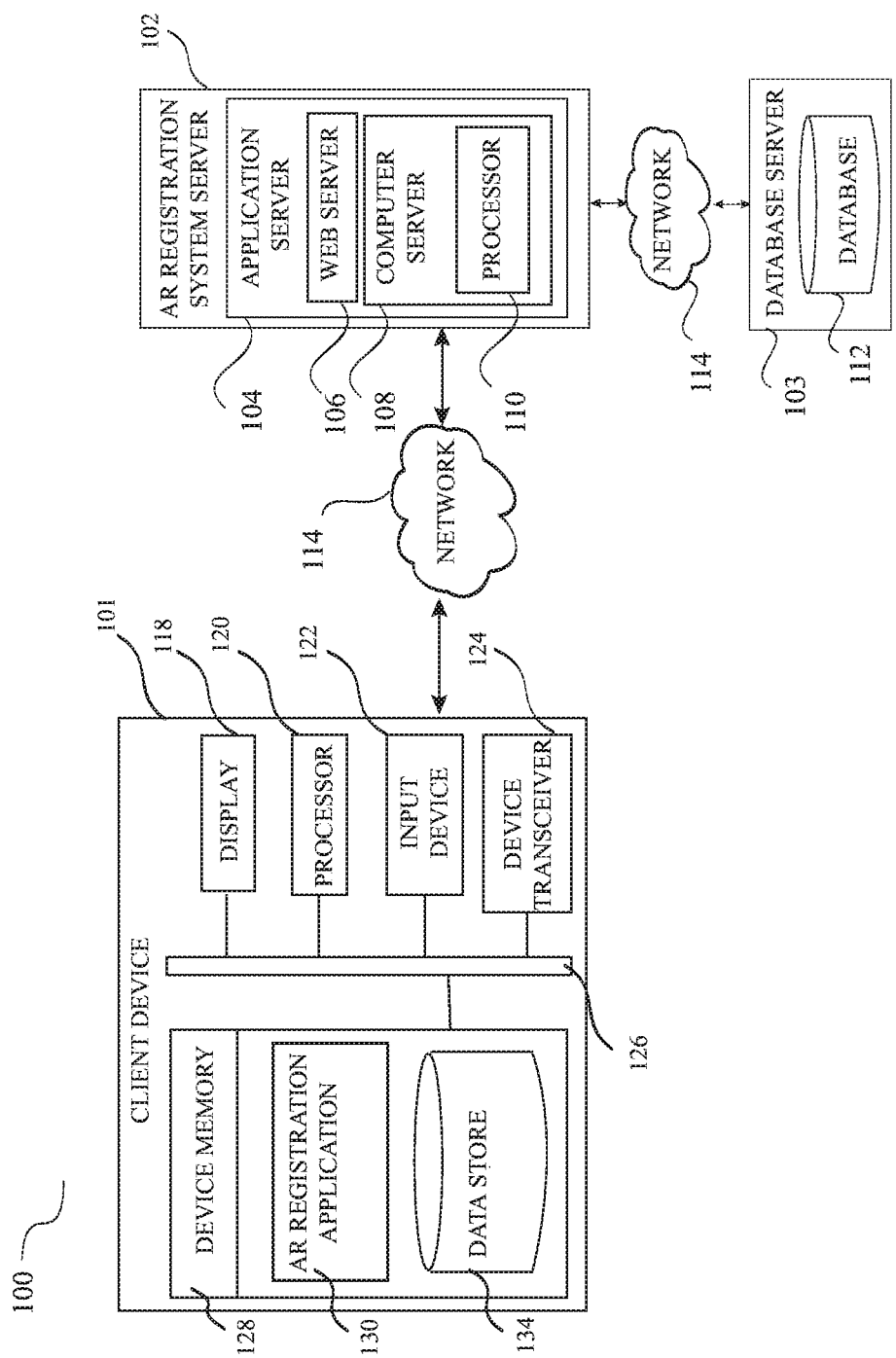
FIG. 1 illustrates a general architecture for a system of augmented reality registration services.

FIG. 1 illustrates the general architecture of an augmented reality (AR) registration service system 100 that operates in accordance with one embodiment of the present invention. In a preferred embodiment, system 100 is implemented in multi-tier or n-tier architecture with one or more client devices 101 residing at the client tier, one or more servers 102 in the middle or server application tier and one or more database servers 103 residing in the database tier. In the above variant of three-tier architecture the client, the first tier, may have to only perform the user interface i.e., validate inputs; in which case the middle tier holds all the backend logic and does data processing while the data server, the third tier, performs data validation and controls the database access.

One or more client devices 101 are connected to an AR registration system server 102 via a network 114. The AR registration system server 102 communicates with the client devices 101 over the network 114 to present a user interface or graphical user interface (GUI) for the AR registration service system 100 of the present invention. The user interface of the AR registration service system 100 of the present invention can be presented through a web browser or through a mobile application communicating with the AR registration system server 102 and is used for displaying, entering, publishing, and/or managing data required for the AR registration service. As used herein, the term "network" generally refers to any collection of distinct networks working together to appear as a single network to a user. The term also refers to the so-called world wide "network of networks" or Internet which is connected to each other using the Internet protocol (IP) and other similar protocols. As described herein, the exemplary public network 114 of FIG. 1 is for descriptive purposes only and it may be wired or wireless. Although the description may refer to terms commonly used in describing particular public networks such as the Internet, the description and concepts equally apply to other public and private computer networks, including systems having architectures dissimilar to that shown in FIG. 1. The inventive idea of the present invention is applicable for all existing cellular network topologies or respective communication standards, in particular GSM, UMTS/HSPA, LTE and future standards.

With respect to the present description, the AR registration system server 102 may include any service that relies on a database system that is accessible over a network, in which various elements of hardware and software of the database system may be shared by one or more users of the system 100. To this end, the users of the client device 101, from which a request or instruction is received over a network 114, may include any individual customer, a governmental or non-governmental organization, a group etc. The GUI or user interface provided by the AR registration system server 102 on the client devices 101 through a web browser or mobile app may be utilized by the users for signing up, submitting data, creating virtual objects, viewing virtual objects, registering virtual objects for AR display, registering rights for virtual object hosting in augmented reality display, making payment etc. The term virtual object is used herein to refer to any computer generated or imported digital content such as images, videos, text and animations etc.

The components appearing in the AR registration system server 102 refer to an exemplary combination of those components that would need to be assembled to create the infrastructure in order to provide the tools and services contemplated by the present invention. As will be apparent to one skilled in the relevant art(s), all of components "inside" of the AR registration system server 102 may be connected and may communicate via a wide or local area network (WAN or LAN).

The AR registration system server 102 includes an application server or executing unit 104. The application server or executing unit 104 comprises a web server 106 and a computer server 108 that serves as the application layer of the present invention. The Web server 106 is a system that sends out Web pages containing electronic data files in response to Hypertext Transfer Protocol (HTTP) requests from remote browsers (i.e. browsers installed in the client devices 101) or in response to similar requests made through a mobile app or mobile application of the present invention installed on a client device 101. The web server 106 can communicate with the mobile app of the present invention and/or with a web browser installed on a client device 101 to provide the user interface required for the AR registration service.

The computer server 108 may include a processor 110, a random access memory (RAM) (not shown in figures) for temporary storage of information, and a read only memory (ROM) (not shown in figures) for permanent storage of information. Computer server 108 may be generally controlled and coordinated by an operating system software. The operating system controls allocation of system resources and performs tasks such as processing, scheduling, memory management, networking, and 110 services, among other things. Thus, the operating system resides in system memory and, on being executed by CPU, coordinates the operation of the other elements of the AR registration system server 102.

Although, the description of the computer server 108 may refer to terms commonly used in describing particular computer servers, the description and concepts equally apply to other processing systems, including systems having architectures dissimilar to that shown in FIG. 1.

The database tier is the source of data where at least one database server 103 (shown only one in the figure) generally interfaces multiple databases 112 (shown only one in the figure). Those databases are frequently updated by their users and administrators most often through a combination of private and public networks 114 including the Internet. It would be obvious to any person skilled in the art that, although described herein as the data being stored in a single database, different separate databases can also store the various data and files of multiple users. For storage and manipulation of three-dimension (3D) polygons a spatial database or geodatabase—a database that is optimized to store and query data that represents objects defined in a geometric space is used. The database 112 of the present invention handles complex structures such as 3D objects, topological coverage, linear networks etc. Spatial indices are used by the database 112 to optimize spatial queries. Conventional index types do not efficiently handle spatial queries such as how far two points differ, or whether points fall within a spatial area of interest.

Reference to FIG. 1, the mobile application, or "app," is a computer program that may be downloaded and installed in client device 101 using methods known in the art. Hereinafter, the mobile app 130 is referred to as AR registration app 130. The AR registration app 130, custom built for the present invention, enables one or more persons to do various tasks related to the AR registration system of the present invention. The activities related to the AR registration service of the present invention can also be performed using the user interface (or GUI) presented through a client device based web browser. Hereinafter, the term "user interface" is used to refer to both AR registration app user interface and the web browser user interface of the present invention. Examples of client device 101 may include, but not limited to, mobile devices, tablets, hand-held or laptop devices, smart phones, personal digital assistants, desktop computers wearable devices, AR glasses, VR headsets or any similar device.

As illustrated in FIG. 1, the client device 101 may include various electronic components known in the art for this type of device. In this embodiment, the client device 101 may include a device display 118, a computer processor 120, a user input device 122 (e.g., touch screen, keyboard, microphone, and/or other form of input device known in the art), a device transceiver 124 for communication, a device memory 128, the AR registration app 130 operably installed in the device memory 128, a local data store 134 also installed in the device memory 128, and a data bus 126 interconnecting the aforementioned components. For purposes of this application, the term "transceiver" is defined to include any form of transmitter and/or receiver known in the art, for cellular, WIFI, radio, and/or other form of wireless or wired communication known in the art. Obviously, these elements may vary, or may include alternatives known in the art, and such alternative embodiments should be considered within the scope of the claimed invention.

Figure 6:
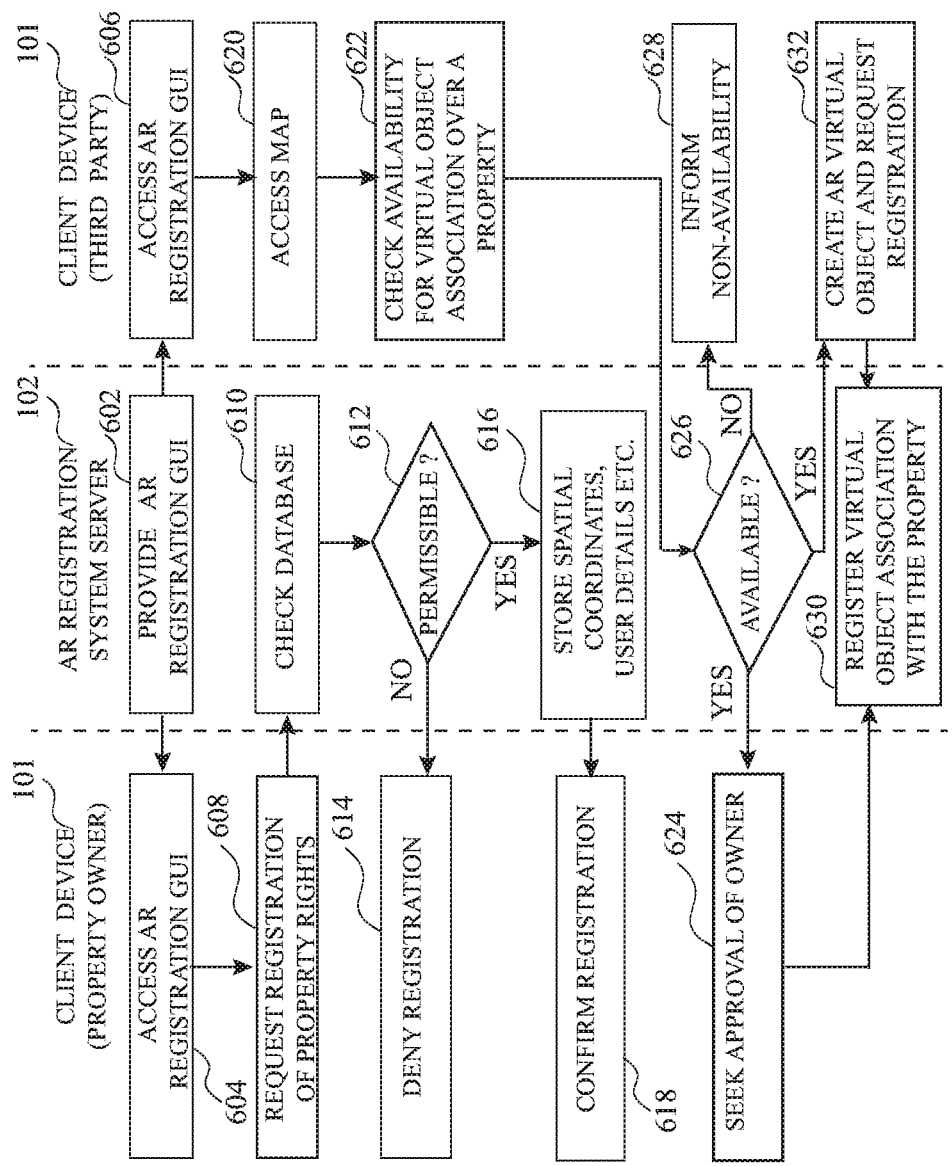
FIG. 6 is a flow diagram illustrating a method for registering rights for augmented reality hosting in accordance with an embodiment of the present invention.

The AR registration system server 102 of the present invention provides a user interface as in step 602 of FIG. 6 and a property owner can access the user interface provided by the AR registration system server 102 through a client device 101 as in step 604. The term "property owner" is used herein to refer to any individual, group, organization (governmental or non-governmental) or any legal entity which legally owns a property. Examples of property includes both immovable real property such as land, building etc. and movable or personal property such as an automobile, aircraft, yacht, mobile phone, beacons etc.

Figure 2:
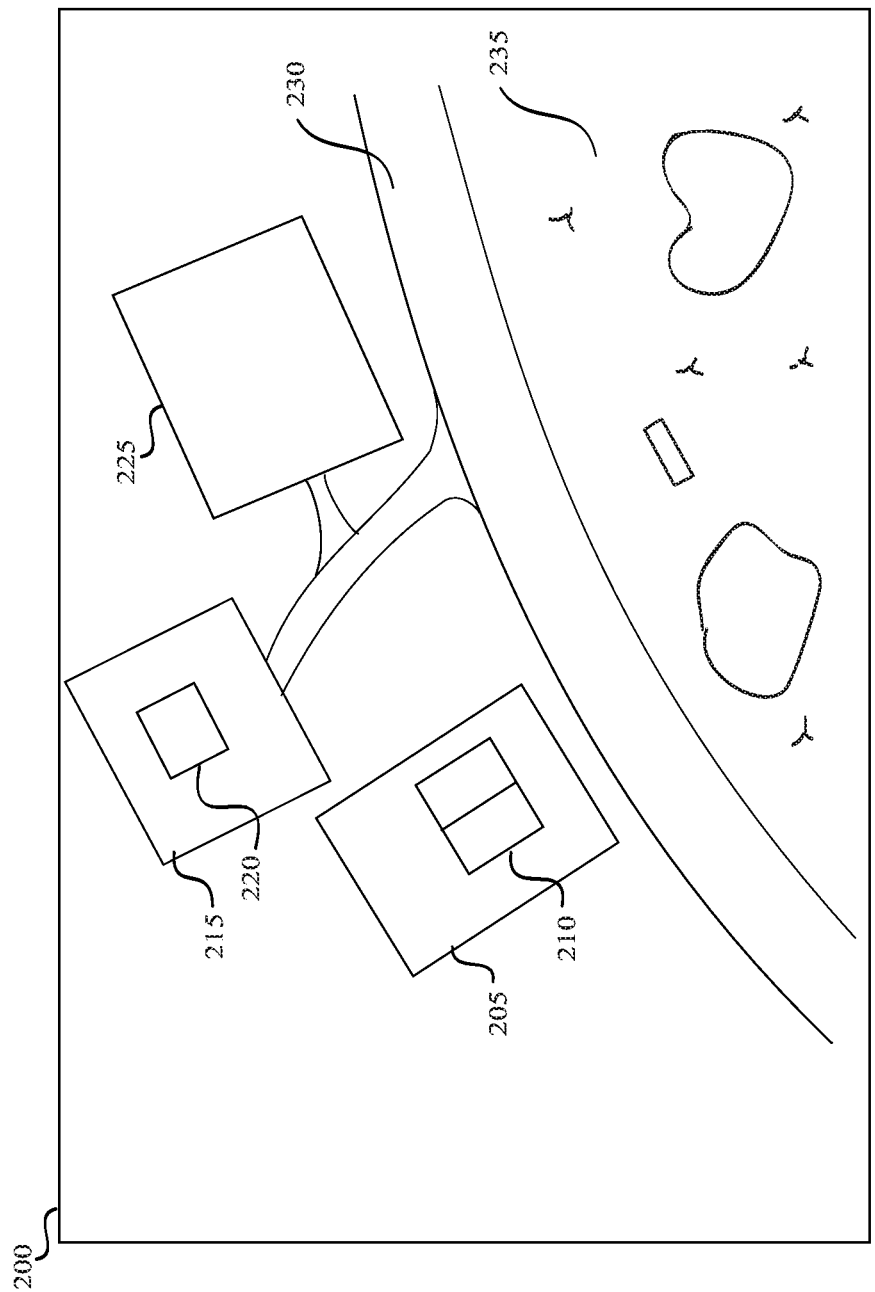
FIG. 2 illustrates an exemplary screenshot of a user interface showing a map in accordance with an embodiment of the present invention.
Figure 3:
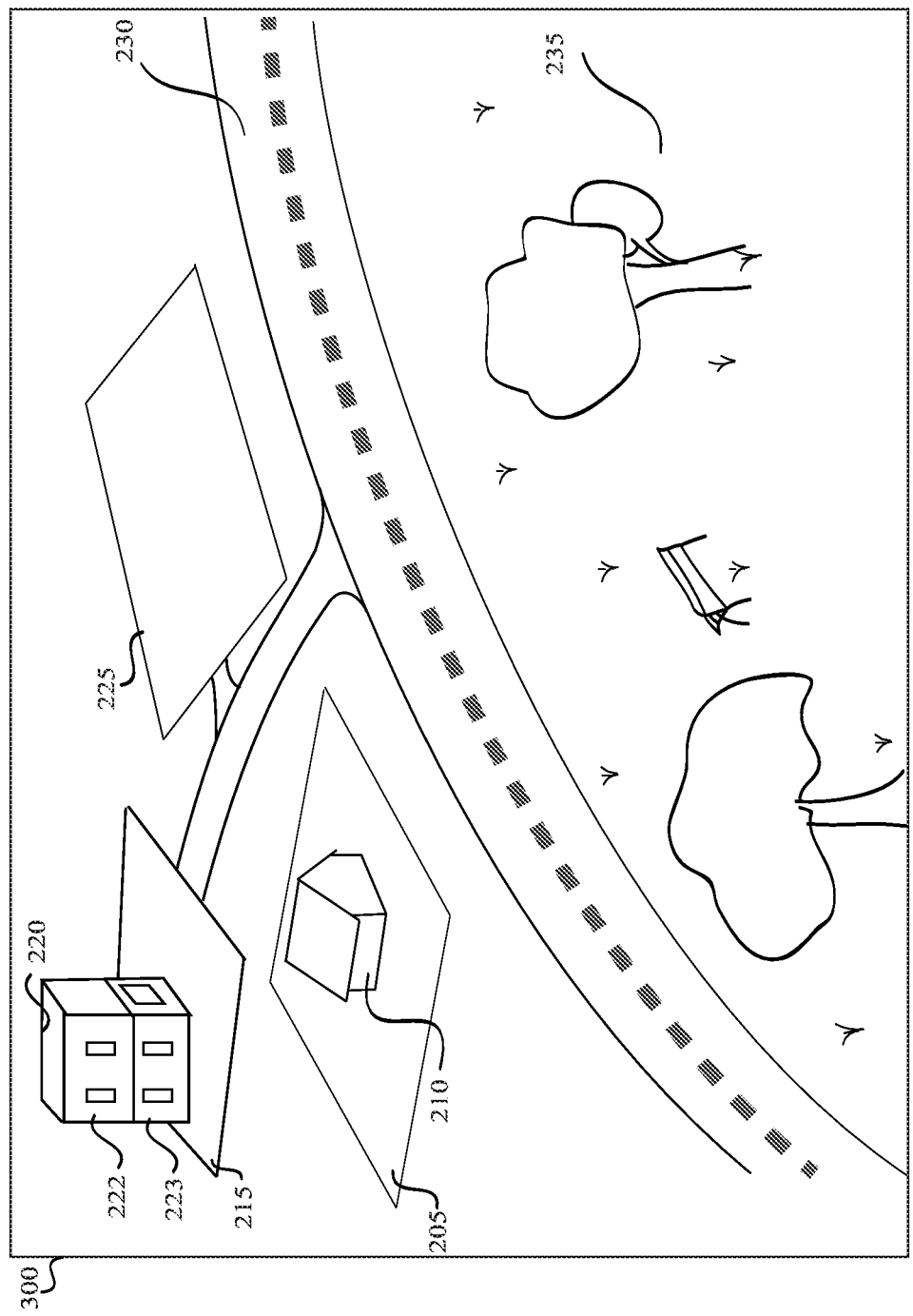
FIG. 3 illustrates an exemplary screen shot of a user interface showing the map in a perspective view in accordance with an embodiment of the present invention.

The database 112 stores geographical maps or satellite maps of real world such as one shown in screenshot 200 of FIG. 2. In some embodiments the maps of real world are stored with legal land descriptions including latitudes and longitudes (GPS coordinates). Additionally, in some other embodiments, the database 112 stores geographical/satellite maps with three-dimensional Cartesian coordinate parameters and/or geographical coordinates (together, alternatively and interchangeably referred to as spatial coordinates) such as latitude, longitude and altitude for defining three-dimensional (3D) objects (3D polygons) such as buildings and other immovable manmade or natural structures including vegetation, trees (real property) and personal properties. FIG. 3 is one such exemplary screenshot 300 of the user interface showing 3D objects in the map. A coordinate system (also called a spatial reference system) is a means of assigning coordinates to a location and establishing relationships between sets of such coordinates. It enables the interpretation of a set of coordinates as a representation of a position in a real world space. The term coordinates reference system, spatial coordinate system, Cartesian coordinate system, geographic coordinate system are used herein alternatively and interchangeably.

A property owner can create a user account having a unique identity (ID) in the AR registration system server 102 after providing relevant user details such as name, address etc. and, in some embodiments, users are required to establish authenticity of the submitted user details. After accessing a map (e.g. map shown in FIG. 2 or FIG. 3), a property owner can locate a real property in the map and make a request for registration of the real property for its land rights and/or air rights with the AR registration system server 102 for virtual object hosting in augmented reality environment as in step 608. FIG. 2 and FIG. 3 illustrate a map/satellite image (hereinafter the terms "map", "geographical map" and "satellite image" are used alternatively and interchangeably) of an exemplary location which has a government/state owned park 235, a public road 230, a private property/plot 205 having a house 210 built on it, another private plot 215 having a building 220 built on it and a plot 225 owned by an organization. While map shown in FIG. 2 has the property details in two-dimension (2D), map of FIG. 3 shows the properties in three-dimension (3D) perspective view.

On receiving a request from a user (a property owner in the present instance) the AR registration system server 102 carries out a check/query at the database 112 with the help of database server 103 as in step 610 of FIG. 6 to find out the status of the real property against which the request was made. For example, a property owner, who owns the plot 205 indicated in FIG. 2 and FIG. 3, may wish to register the plot 205 for virtual object hosting/floating in augmented reality environment and, in that case, on receiving the request from the user, the AR registration system server 102 checks the database 112 to find out if the user has the legal land/air right over the property 205. If it is found, as in step 612, that the user does not have the legal land/air rights over the property 205, the AR registration system server 102 informs the user that the registration request has been denied as in step 614. In step 612, if it is found that the user has legal land/air rights over the property 205, then the AR registration system server 102 associates the unique ID of the user with the property and registers the details in its database 112 as in step 616 and further informs the user about confirmation of registration as in step 618. Once the confirmation is generated the legal entitlement of hosting a virtual object in augmented reality over the registered property gets exclusively reserved for the user i.e. the property owner and the user enjoys the sole right of deciding what to display over the registered property in augmented reality. The AR registration service system 100 of the present invention allows a user (a property owner) to add a property or a geographic location to the database 112.

In a preferred embodiment, the present invention allows registration of rights over a multi-dimensional real property such as building and other structures. For example, reference to FIG. 3, another property owner who owns a plot 215 may wish to register a multidimensional property such as the building 220 for virtual object hosting in AR environment. The capability of the database 112 in hosting spatial 3D data related to the dimensions of the objects allows making different parts of the real property available for registration for virtual object hosting in augmented reality. For example, in case of building 220, the property owner may enlist/register ground floor 223 and first floor 222 for hosting separate and independent virtual objects for each floor or for each façade of the building 220.

In some embodiments, the AR registration service system 100 of the present invention enables, in addition to registration of rights for real property (property consisting of land or buildings) based virtual object hosting as described above, registration of rights for personal property (other than real property—stationary or mobile) based virtual object hosting. For example, a user can register rights for hosting/floating virtual object in augmented reality over the user's personal property (moving or stationary) through the AR registration service system 100 and such data is kept stored in the database 112.

Once a real or personal property is registered with the AR registration system server 102, the property owner user may host/float a virtual object over that property himself/herself or may rent/lease the rights for floating/hosting the virtual object over the property to any third party user who is registered with the AR registration system server 102 of the present invention.

Similar to creation of user account for property owner users, the AR registration service system 100 of the present invention allows creation of user accounts for other third parties who may be interested in hiring/leasing legal rights for hosting virtual objects over a property in augmented reality environment. The term "third party" is used herein to refer to any individual, group, organization (governmental or non-governmental) or any legal entity who wants to rent/hire/lease air rights for hosting virtual objects in augmented reality environment over a legal property.

Figure 4:
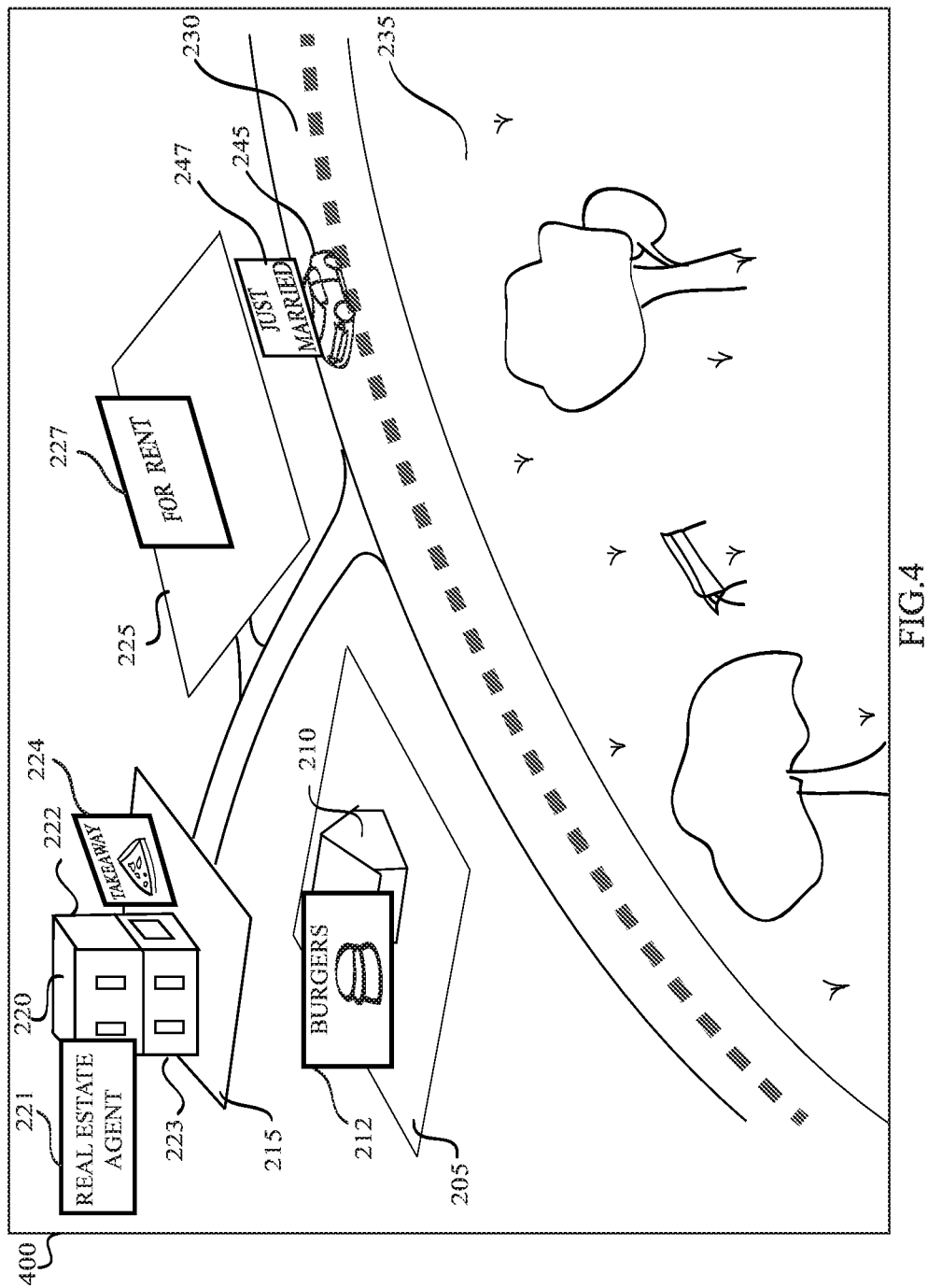
FIG. 4 illustrates an exemplary screen shot of a user interface showing virtual objects in augmented reality in accordance with an embodiment of the present invention.

A third party user may access the AR registration GUI on a client device 101 as in step 606 of FIG. 6 and search the location of his/her interest on a map retrieved from the database 112. For example, a third party user may be interested in floating/hosting a virtual object over plot 205 shown in FIG. 3. In such a case, the third party user may, on accessing the map, such as one shown in FIG. 2 or FIG. 3, as in step 620, check availability of the plot 205 for virtual object hosting as in step 622 by submitting a request through the user interface of the present invention. AR registration system server 102 then checks the availability of the property 205 in the database 112 as in step 626. The plot 205 may already have a virtual object hosted over the plot by the property owner or by any other third party user authorized by the property owner and, in such a situation, the AR registration system server 102 will inform the enquiring third party user about the non-availability of the property for virtual object hosting as in step 628. But, if the AR registration system server 102 finds that the plot 205 is available for virtual object hosting, then permission/approval of the legal owner of the property/plot 205 would be sought by the AR registration system server 102 as in step 624. If the property owner approves the request (which may involve payment of certain fee by the third party user to the property owner) then the AR registration system server 102 would allow hosting of a virtual object over the property 205. The third party user may then create/import a virtual object 212 and request for registration of the same for floating/hosting over the property 205 as shown in FIG. 4 as in step 632. The AR registration system server 102 would then register the virtual object 212 for display in augmented reality as in step 630.

Another third party user, say for example the tenant of the ground floor 223 of the building 220 shown in FIG. 4, may be interested in floating a virtual advertisement (i.e. virtual object) on the building facade limited to ground floor only. The tenant of the ground floor can take permission/approval from the owner of the property 215 through the AR registration system server 102 for hosting the virtual object 224 in augmented reality environment at a certain height of the building 220 (for example up to the ground floor roof). Similarly, as the AR registration service system 100 of the present invention enables registration of a virtual object over a 3D object in terms of 3D coordinate system (Cartesian coordinates or latitude, longitude and altitude) another tenant of the first floor 222 may register, with approval from the property owner, to float/host a virtual advertisement 221 over the first floor of the building on a different facade of the building without hindering/obstructing the hosting of the virtual object 224 on the ground floor 223.

In the same way, by way of example, government/state authorities can get the rights for hosting virtual objects over the state owned park 235 and public road 230 registered in AR registration system server 102. Similarly, the organization which owns the plot 225 can register the virtual object hosting rights for the plot 225.

As discussed above, the AR registration service system 100 of the present invention acts, maintains and manages the central database 112 as a central/global registry for registration of virtual object hosting/associating/floating rights on or over real property and personal property for display in augmented reality environment. To this effect, in a preferred embodiment, the AR registration service system 100 creates and maintains a domain name system for registration of virtual object hosting/associating/floating rights as per the type of property being registered. For example, there can be a generic top-level domain (gTLD) name for the category of virtual objects hosting/associating rights over private real property. Similarly, the AR registration service system 100 maintains separate categories of gTLD's for virtual object holding rights over public property, government property, personal property, commercial property, educational property, military property etc. Further, the AR registration service system 100 authorizes different independent registrars, which may be organizations or companies, to provide above mentioned domain registration with the AR registration system server 102.

Figure 5:
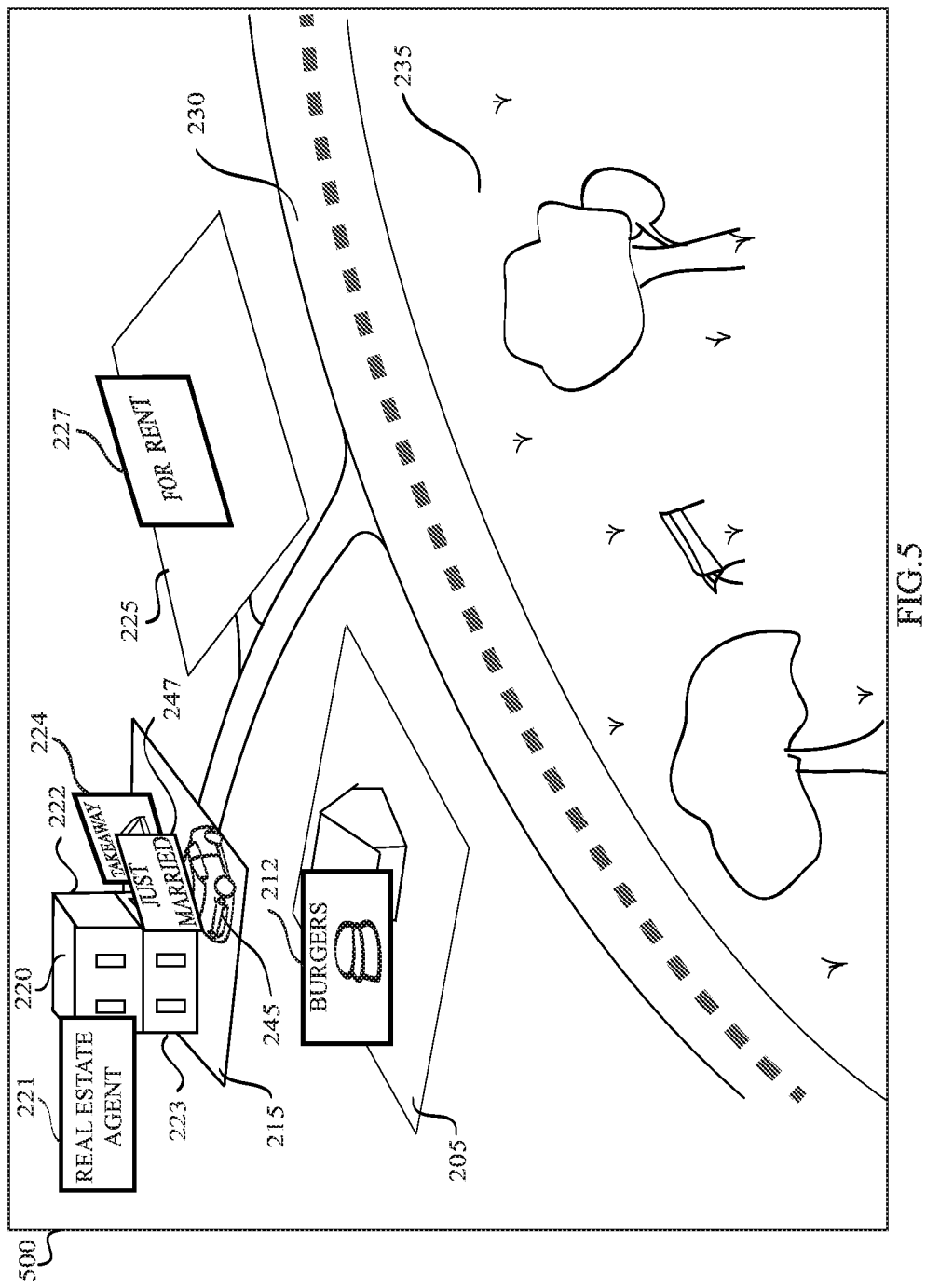
FIG. 5 illustrates an exemplary screen shot of a user interface showing virtual objects in a conflicting situation in accordance with an embodiment of the present invention.

FIG. 4 shows a virtual object 227 tagged to the plot 225. FIG. 4 also shows a vehicle (i.e. a personal property) 245 on a public road 230. If the owner of the vehicle 245 wants to associate a virtual object 247 with the vehicle 245 in stationary or moving positions then it has to be registered with the AR registration system server 102. For any moving object to which a virtual object is associated with, there can arise many conflicting situations in terms of display of virtual object rights in augmented reality environment. For example, when the vehicle 245 is moving on the road 230 it is in a public space for which the state/government may have the virtual object hosting rights reserved with the AR registration system server 102. Again, as shown in FIG. 5, when the vehicle 245 enters a private property such as 215, there may be conflict in terms of virtual object hosting rights if the property owner has the rights registered with the AR registration system server 102 for hosting virtual object in augmented reality in the plot 215. For such scenarios, the AR registration service system of the present invention allows implementation of different user preferred virtual object display options for augmented reality environment. For example, for his real or personal property registered with the AR registration system server 102, the property owner may set the option through the user interface for allowing display of virtual object associated with a non-stationary personal property (e.g. cars, aircrafts, ships, mobile devices) belonging to a third party over his property (i.e. the property owner's registered property). The term registered property is used herein to refer to any real or personal property for which the property owner has virtual object hosting rights registered with the AR registration system server 102. While in some other instances such permission for hosting virtual object may be given by the property owner as long as the view of virtual object hosted by the property owner does not get obstructed by a virtual object hosted by a third party. Again, the property owner may allow hosting of a virtual object associated with a personal property owned by a third party to remain visible in every situation in augmented reality even when the third party's personal property remains within the coordinates of the real property registered with the AR registration service system by the real property owner. In those cases where the real property owner has set the option for not allowing hosting of a virtual object associated with a personal property owned by a third party when such a third party owned personal property enters the spatial coordinates registered for the real property owner, the display of virtual object over the third party's property gets disabled.

In some embodiments, a property owner or a third party approved by the property owner for retaining the air rights may allow posting of a virtual object within his/her registered property spatial coordinates by any ordinary user (a user who does not have predefined right for associating virtual object over the property) of the user interface. To do so, an ordinary user may simply visit the user interface and request floating/associating a virtual object within the spatial coordinates of a property registered with the AR registration system server 102. Depending on automatic and/or administrator (property owner or otherwise) controlled content filtration options provided by the AR registration system server 102, the virtual object posting requested by an ordinary user may be fully allowed, partially allowed or fully blocked. In some embodiments, the property owner or an approved third party may be allowed, at their discretion, to delete, move or otherwise modify the AR object. For example, the registered property owner or a third party approved by the registered property owner of property 205 may request the AR registration system server 102 to allow any ordinary user to post a review in the form of a virtual object over the property 205. In some instances, such a permission granted by the property owner or the approved third party is conditional. For example, an owner of a restaurant situated over the property 205, who can be the property owner or a third party approved by the property owner, may wish to keep the air space over the property 205 open for ordinary users (e.g. restaurant customers) to leave feedback, public posts or reviews (referred to as augmented reality post or AR post alternatively or interchangeably) over the property 205 in terms of virtual objects viewable in augmented reality environment. As per the conditions set by the restaurant owner of the present example, the AR registration system server 102 may enable the restaurant owner to manually delete, respond to or modify such a feedback, public post or review (i.e. AR post). The restaurant owner may move the AR post away from his/her air space over property 205 by a physical action executed through the user interface of the AR registration application of the present invention. Example of such a physical action may include, but not limited to, selecting and holding an AR post on the user interface by the restaurant owner with his/her finger for a specific period of time and then simply moving the AR post away from the perimeter of the property 205 which will result in removal of the selected AR post from the database 112. In another example, the restaurant owner selects the AR object on the user interface and "pinches" the screen of the client device to push the AR post away in the direction he/she is facing. In some instances, as per the condition set by the property owner or the approved third party, a positive AR post (an AR post which contains good review) can cancel out a negative AR post (a bad review).

In some embodiments, AR registration system server 102 may allow, as per condition set by the air rights owner, to automatically get a VR object (or AR post) associated over a second property which was posted originally over a first property over which the same owner owns the air rights. For example, if the restaurant owner owns rights for associating virtual objects over both the properties 205 and 215, he/she may request the AR registration system server 102 to associate any or all the virtual objects over property 215 which have been originally posted over property 205.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "in some embodiments", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale The flowchart is used to describe the steps of the present invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowcharts may be included in performing this method. Accordingly, the specific arrangement of steps shown in FIG. 6 should not be construed as limiting the scope of the invention Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for registration of rights for hosting virtual objects in augmented reality environment, said system comprising:
   one or more client devices;
   at least one database server interfaced with one or more databases, said one or more databases comprising one or more maps comprising having geographical or satellite maps defined in one or more spatial coordinates; and
   at least one augmented reality registration server communicatively connected to said one or more client devices through a first network and to said at least one database server through a second network,
   said at least one augmented reality registration server comprising one or more physical processors programmed with computer program instructions that, when executed by said one or more physical processors, causes said at least one augmented reality registration server to;
   provide a user interface on said one or more client devices;
   receive said one or more special coordinates of a location of a property through said user interface on said one or more client devices from a property owner for a registration of rights for an association of one or more virtual objects in augmented reality environment over said one or more spatial coordinates of said location of said property;
   authorize by granting said registration of said rights over said one or more spatial coordinates,
   said property owner to control said association of said one or more virtual objects in augmented reality environment over said one or more spatial coordinates of said location if permissible as per records of said one or more databases; and
   deny attempt of a third party said association of said one or more virtual objects in augmented reality environment over said one or more spatial coordinates of said location of said property in case of non-fulfillment of conditional permission set in said augmented reality registration server by said property owner.

2. The system as in claim 1, wherein different virtual objects of said one or more virtual objects are associated at different coordinates of said one or more spatial coordinates.

3. The system as in claim 1, wherein said one or more conditions are set by said property owner.

4. The system as in claim 1, wherein said one or more virtual objects comprises one or more augmented reality posts made by one or more ordinary users.

5. The system as in claim 4, wherein said one or more augmented reality posts are editable and removable by said property owner or by said third party approved by said property owner.

6. The system as in claim 4, wherein said one or more augmented reality posts are editable and removable by said property owner or by said third party approved by said property owner through a physical action executed on said user interface.

7. The system as in claim 4, wherein a positive augmented reality post from said one or more augmented reality posts cancels out a negative augmented reality post from said one or more augmented reality posts.

8. The system as in claim 4, wherein said one or more augmented reality posts associated with said one or more spatial coordinates get associated with another one or more coordinates for which said property owner is authorized by said augmented reality registration server for display in augmented reality environment as per preference set as a part of said one or more conditions.

9. The system as in claim 1, wherein said augmented reality registration server enables said registration of rights for associating virtual objects over said one or more spatial coordinates for display in augmented reality environment as per category of said one or more virtual objects or as per ownership of said one or more virtual objects.

10. The system as in claim 1, wherein said augmented reality registration server enables said registration of rights for associating one or more virtual objects over said one or more spatial coordinates for display in augmented reality environment as per category of said property.

11. The system as in claim 1, wherein said one or more databases store said one or more virtual objects.

12. The system as in claim 1, wherein said augmented reality registration server enables said property owner to add a new immovable or a movable property or a geographic location to said one or more databases.

13. A method for registration of rights for hosting virtual objects in augmented reality environment in an augmented reality registration service system, said augmented reality registration service system comprising
   one or more client devices,
   at least one database server interfaced with one or more databases, and
   at least one augmented reality registration server communicatively connected to said one or more client devices through a first network and to said at least one database server through a second network to provide a user interface at said one or more client devices,
   said at least one augmented reality registration server comprising one or more physical processors programmed with computer program instructions that, when executed by said one or more physical processors, cause said at least one augmented reality registration server to perform said method, said method comprising the steps of:
   providing a user interface on said one or more client devices;
   receiving one or more spatial coordinates of a location of a property through said user interface from a property owner for a registration of rights for an association of one or more virtual objects in augmented reality environment over said one or more virtual objects in augmented reality environment over said one or more spatial coordinates of said location if permissible; and
   denying attempt of a third party said association of said one or more virtual objects in augmented reality environment over said one or more spatial coordinates of said location of said property in case of non-fulfillment of one or more conditions set in said augmented reality registration server.

14. The method as in claim 13, wherein different virtual objects of said one or more virtual objects are associated different coordinates of said three-dimensional spatial coordinates.

15. The method as in claim 13, wherein said one or more conditions are set by said property owner or said third party approved by said property owner.

16. The method as in claim 13, wherein said augmented reality registration server enables said registration of land rights and/or air rights for associating said one or more virtual objects over said one or more coordinates for display in augmented reality environment as per category of said one or more virtual objects or as per ownership of said one or more virtual objects or as per category of said property.

17. A system for registration of rights for hosting virtual objects in augmented reality environment, said system comprising:
   a client device;
   a database server interfaced with a database, said database comprising a map defined in spatial coordinates; and
   an augmented reality registration server communicatively coupled to said client device and to said database,
   said augmented reality registration server comprising a physical processor programmed with computer program instructions that, when executed by said physical processor, causes said augmented reality registration server to;
   provide a user interface on said client device;
   receive said special coordinates of a location of a registered property through said user interface on said client device from a registered property owner for a registration of rights for an association of a virtual object in augmented reality environment over said spatial coordinates of said location of said registered property;
   authorize by granting said registration of said rights over said spatial coordinates,
   said registered property owner to control said association of said virtual object in said augmented reality environment over said spatial coordinates of said location of said registered property; and
   implement a virtual object display option for said augmented reality environment.

18. The system of claim 17, wherein said virtual object is associated with a non-stationary personal property.

19. The system of claim 17, wherein said virtual object display option enables said property owner to allow posting of a virtual object within said registered property spatial coordinates by an ordinary user.

20. The system of claim 17, wherein an ordinary user may utilize said user interface to request posting a virtual object within said spatial coordinates of said property registered with said AR registration system server.

21. The system of claim 20, wherein said virtual object posting request by said ordinary user may be fully allowed, partially allowed, or fully blocked depending on said virtual object display option for said augmented reality environment.

22. The system of claim 21 wherein allowance of said virtual object posting request by said ordinary user is a conditional allowance.

23. The system of claim 17 wherein said virtual object display option enables said property owner to execute a physical action through said user interface of said AR registration application so as to move a virtual object posting within said registered property spatial coordinates.

24. The system of claim 23 wherein the physical action comprises moving the virtual object away from or within a perimeter of said registered property.

* * * * *